Figure 2:
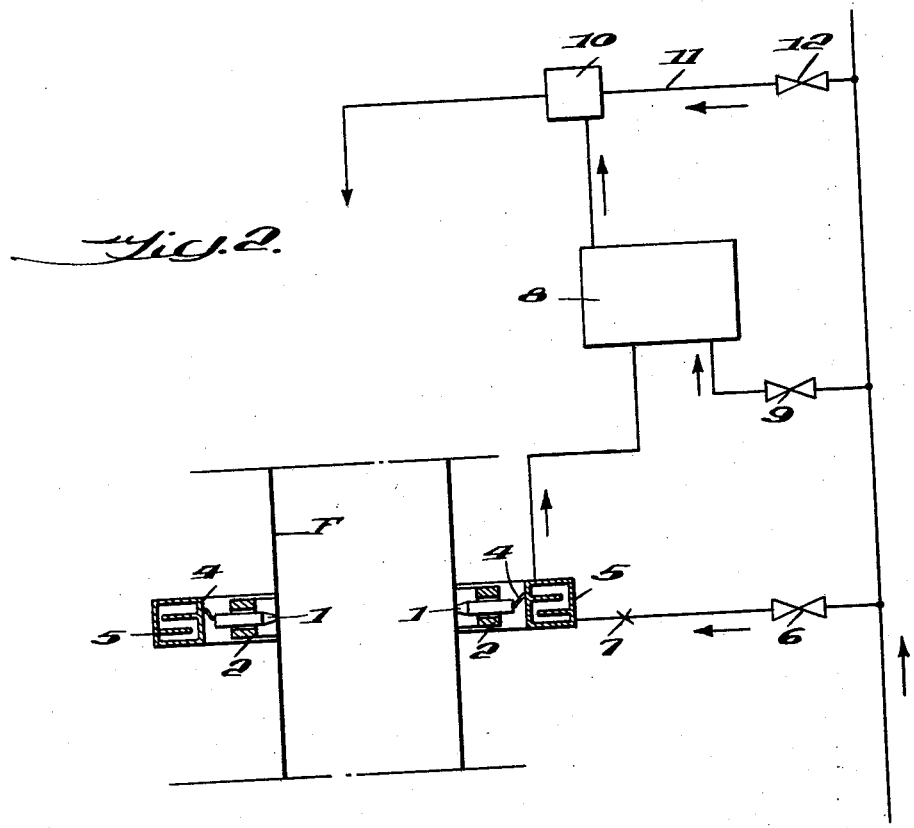

INVENTORS
WILLIAM ALLAN COOK,
SUMNER SHELDON FEINSTEIN,
BY Robert W Black
AGENT

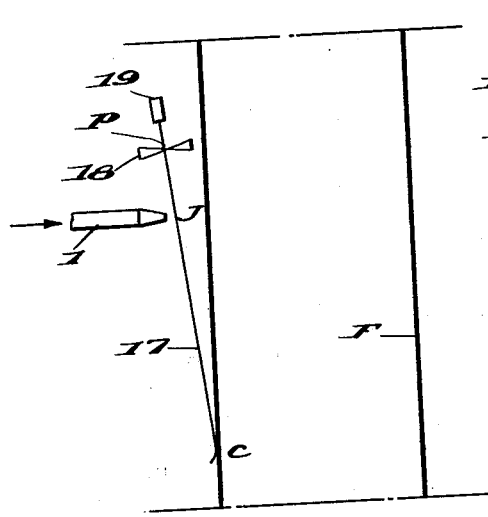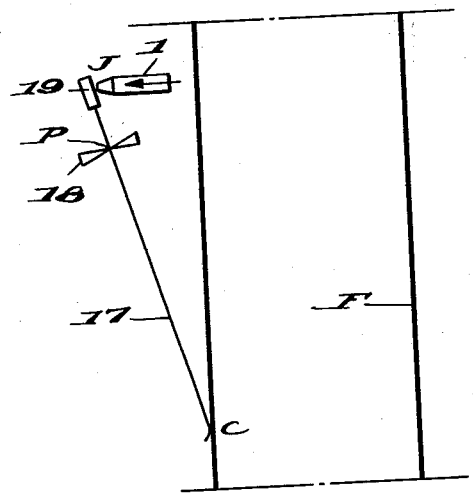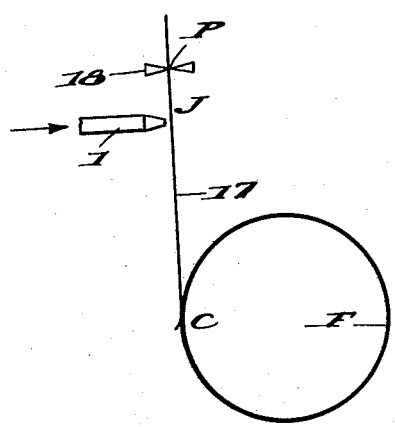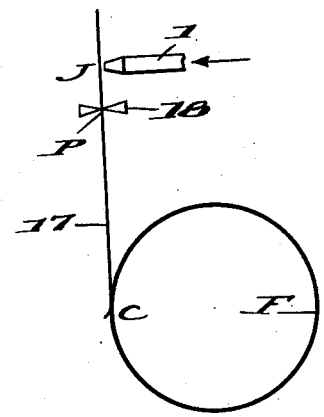

United States Patent Office 3,125,616
Patented Mar. 17, 1964

3,125,616
PROCESS FOR THE PRODUCTION OF THERMO-
PLASTIC POLYMERIC FILM
William Allan Cook, Wilmington, Del., and Sumner Sheldon Feinstein, Snyder, N.Y., assignors to E. I. du Pont de Nemours and Company, Wilmington, Del., a corporation of Delaware
Filed Apr. 23, 1962, Ser. No. 189,605
5 Claims. (Cl. 264—40)

This invention relates to a process for controlling bubble size in the tubular extrusion of thermoplastic films and more particularly to a process for detecting and correcting thickness variation in the tubular extrusion of thermoplastic films.

In the production of polymeric film, particularly for packaging applications, tubular processing techniques which combine continuous melt extrusion and internal gaseous expansion are widely employed for economic reasons. Operability and correct film properties require that the bubble size be controlled precisely. Prior control was accomplished by controlling the internal gaseous pressure; however, this has the disadvantage of requiring visual observation of the bubble while seeking the proper value to set the gaseous pressure control point and also requiring a new bubble pressure setting upon a change in the polymer viscosity, throughput, etc.

In U.S. Patent 2,529,897, deviations of the collapsed flat width (i.e., flat diameter) of a tubular film were mechanically sensed outside of a preset control range and signals from these deviations were applied to control gaseous blowing pressure within the tubular film.

The process of the present invention provides a much closer degree of bubble diameter control utilizing the same bubble diameter set-point in a novel and entirely feasible manner.

It is an object of this invention to provide a process for controlling bubble size in the tubular extrusion of thermoplastic film.

Another object of this invention is to provide a process for controlling bubble size in the tubular extrusion of thermoplastic films which is highly sensitive and provides a degree of control accuracy not heretofore possible, with consequent improvements in manufacturing economics as well as in uniformity of film properties. These and other objects will appear hereinafter.

These and other objects are accomplished by the process of this invention which is an improvement in a continuous process for the production of thermoplastic polymeric film in the form of an inflated tubular film of substantially circular cross section, wherein said inflated tubular film attains a predetermined diameter through the coaction of film temperature and gaseous pressure within said inflated tubular film, the improvement comprising: passing said inflated tubular film through an enclosing circular array of pneumatic proximity gauging nozzles disposed concentrically thereabout; detecting changes in said predetermined diameter of said inflated tubular film as fluctuations in the pressure of gaseous jets issuing from said nozzles; changing at least one of said coacting variables of temperature and pressure by means responsive to said pressure fluctuations, said changes thereby counteracting the changes in the diameter of said inflated tubular film causing said pressure fluctuations.

The use of this invention is generic to any continuous process for manufacturing tubular polymeric film wherein at some stage in the process the tubular film attains a predetermined diameter through the coaction of film temperature and gaseous pressure within the tubular film. It can be used to control the diameter not only of dynamically pressured tubular film bubbles where the interior of the tubular film is in constant communication with the gaseous pressure supply but also of statically pressured tubular film bubbles where a specific quantity of gas is held captive within the tubular film between two pressure isolative devices, e.g., two pairs of nip-rolls; one pair of nip-rolls and the face of the extrusion die; or one pair of nip-rolls and a close fitting internal mandrel. These tubular extrusion techniques are conventional in the art, the one employed depending to a great extent on the thermoplastic polymeric film being extruded and its desired final properties. Illustrative techniques are shown in U.S. Patents 2,433,937 to Tornberg, 2,641,022 to Kress, 2,688,773 to McIntire and 2,987,767 to Berry et al.

While for simplicity the process of this invention will be illustrated as applied to a vertically integrated tubular film manufacturing process, it will be understood that it is equally applicable to a horizontally integrated manufacturing process.

Figure 1:
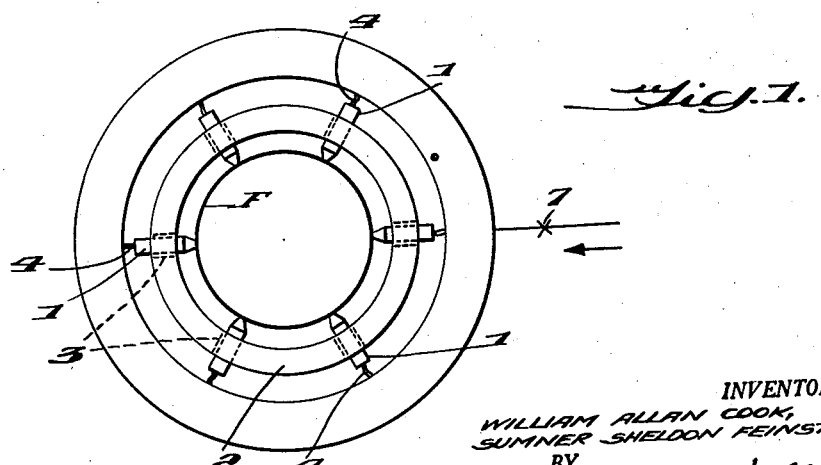
Figure 3:
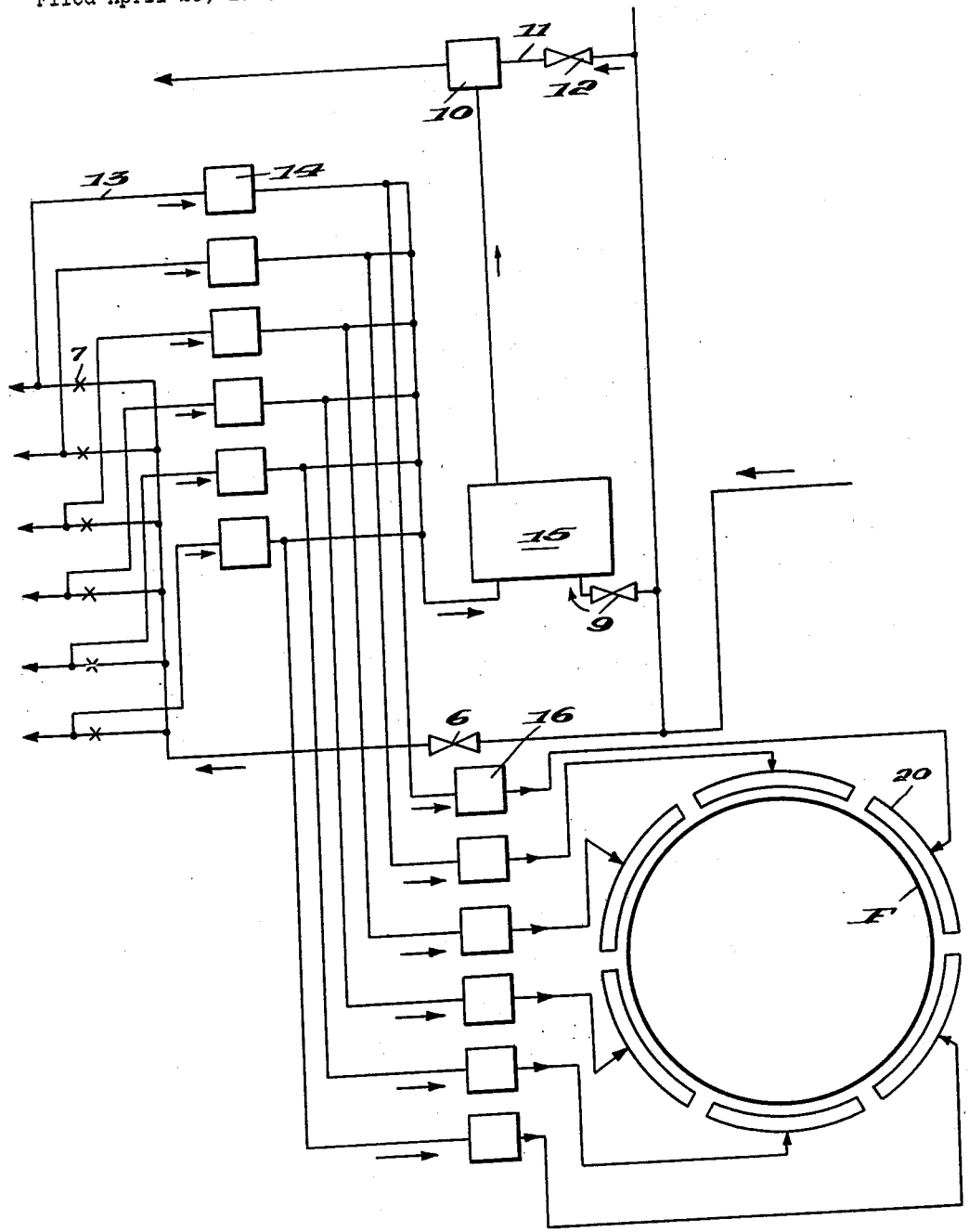

The invention will be more fully understood by referring to the accompanying drawings, wherein:

FIGURE 1 illustratively shows one arrangement of the pneumatic proximity gauging nozzles disposed about the inflated tubular film, FIGURE 2 diagrammatically shows one bubble diameter control embodiment of the invention, FIGURE 3 diagrammatically shows a preferred bubble diameter control embodiment of the invention, and FIGURES 4 through 7 illustratively show various arrangements of the pneumatic proximity gauging nozzles about the inflated tubular film which will reduce the pressure on the film at each sensing point.

In FIGURES 1 and 2 are illustrated two views of one embodiment of the invention wherein inflated tubular film F passes axially through and is surrounded by an array of pneumatic proximity gauging nozzles 1, spaced mutually equidistant about circular frame 2 and being slidably adjustable (radially with respect to tubular film F) through radial ports 3 in frame 2. Six nozzles are shown here for simplicity but, depending on the circumference of the tubular film and the need for sensitivity in the control system, as many as twenty or more nozzles can be conveniently employed. Nozzles 1 are connected via flexible tubes 4 to a common circular manifold 5, shown here as concentric with and larger in diameter than frame 2 and disposed in the same plane as frame 2. Common manifold 2 can be any convenient diameter and can be displaced vertically from (either below or above) frame 2.

Air is supplied through regulator valve 6 and restricting orifice 7 to manifold 5, internally baffled to balance air delivery to each nozzle. Changes in the net or average back pressure signal caused by changes in the distance of tubular film F from each nozzle tip are transmitted from manifold 5 to proportioning pneumatic controller 8, of conventional design and commercially available, operating on air supplied through valve 9. Pneumatic output signals from controller 8 are applied to actuate diaphragm control valve 10 in bubble air supply line 11 in such a manner that an increase in the diameter of tubular film F over the predetermined "on control" diameter will bring about a reduction in air flow rate through regulator valve 12 and bubble air supply line 11.

When any embodiment of this invention is employed in a tubular film manufacturing process wherein the gaseous pressure inflating the tubular film is less than the pressure directed against the film by the air jets issuing from the nozzles, the film will be slightly dimpled. This need not be troublesome provided calibration of the control system takes this phenomenon into account.

The common manifold system of FIGURES 1 and 2 is particularly useful for sensing diametral changes in an inflated tubular film which is restrained from lateral movement by, for example, an externally positioned cylindrical quench ring. While this system permits detection of diametral changes provided the film-to-nozzle tip distance does not exceed about 0.003 inch, it does not provide for situations where the film will be dimpled more or less than a normal amount by the force of the air jet issuing from a nozzle positioned facing a correspondingly thinner or thicker than normal longitudinal lane of film. A thinner than normal lane can result from a longitudinal lane of film being hotter at the point in the process where the tubular film expands in response to internal gaseous pressure. Conversely, a thicker than normal lane can result from a longitudinal lane of film being cooler. These thermal irregularities can result from a variety of causes including lack of uniform melt distribution around the circumference of the extrusion die, uneven heat supply about the periphery of the extrusion die and/or tubular film either before or during expansion, quenching capacity unevenly distributed about the periphery of the expanding tubular film, local atmospheric drafts in the process area, etc.

With the common manifold system, in a situation where tubular film F is in "control" position, e.g., about 0.0015 inch away from each of five nozzle tips but with a thicker than normal film lane opposite the sixth nozzle tip creating a film-to-nozzle tip distance of, for example, less than 0.001 inch because of less dimpling, there would be an increase in the net back pressure signal transmitted to controller 8 which would call for less air through supply line 11. This would result in a reduction in bubble diameter to a "below control" level.

Correspondingly, in a situation where tubular film F is uniformly spaced at a distance of about 0.0015 inch away from each of five nozzle tips with a thinner than normal film lane opposite the sixth nozzle creating a film-to-nozzle tip distance of, for example, about 0.005 inch, there would be a reduction in the back pressure signal transmitted to controller 8 which would call for more air through supply line 11. This will result in enlarging the bubble diameter to an "above control" level with the further risk of contact between the film and the tip of one or more of the other five nozzles which could result in a film break and process shutdown.

To compensate for these problems, the embodiment of this invention illustrated in FIGURE 3 provides for situations with which the system depicted in FIGURES 1 and 2 could not adequately cope. In this case, air supplied through regulator valve 6 passes via individual air lines through restricting orifices 7 to nozzles 1, (not shown) the lengths of these air lines between each orifice 7 and nozzle being substantially equal, although not so depicted in this illustration. Back pressure signals from each nozzle are transmitted through air lines 13 to separate conventional electropneumatic transducers 14 which are commercially available wherein the pneumatic signals are converted to corresponding electrical signals. Electrical signals from transducers 14 are transmitted additively to conventional proportioning controller 15 which is commercially available, the output signal from which is applied to actuate diaphragm control valve 10 in bubble air supply line 11 in such a manner than an increase in the average diameter of tubular film F (not shown), as sensed by the air jets, over the predetermined "on control" diameter will bring about a reduction in air flow rate through regulator valve 12 and bubble air supply line 11.

The same electrical signals from transducers 14 are simultaneously transmitted individually to conventional proportioning controllers 16 which are commercially available, the output signals from which are employed to vary the thermal input to or removal from the individual lanes of the tubular film corresponding to the nozzle position from which the initiating signal originated. This thermal control 20 may take the form of (1) varying the current supplied to electrical resistance-type vernier heaters spaced about the periphery of the lip opening of the circular extrusion die; or (2) varying the current supplied to electrical heaters spaced about the periphery of the extruded tubular film either before, during or after its expansion; or (3) where convective means are employed either to heat or cool the film, operating dampers to vary air delivery against a particular longitudinal lane of the film.

Where the diameter of a statically pressured, completely captive film bubble is to be controlled, the output signal from proportioning controller 15 in FIGURE 3 or from proportioning pneumatic controller 8 in FIGURE 2, instead of being applied to actuate a gas supply control valve can be applied to control the overall heat supply to the film bubble as from an externally and concentrically positioned bank of radiant heaters (which may be rotating) or by varying the bulk temperature of the melt issuing from the circular die, while the individual output signals from proportioning controllers 16 can be applied to vernier this heat supply, e.g., by means of vernier thermal units 20 as might be accomplished by operating dampers in individual compartments on an air supply manifold, each compartment facing the longitudinal lane of the tubular film corresponding to the nozzle position from which the initiating signal originated.

Where the pressure within the inflated tubular film is very much lower than that of the air jets impinging on the tubular film, it will be desirable to employ an auxiliary means to reduce the pressure on the tubular film at each sensing point. In FIGURES 4 through 7, each showing for reasons of simplicity the use of but one nozzle, the air jet issuing from each nozzle is directed against a surface remote from the actual sensing or detecting point but which surface is adapted to vary responsively to changes in the position of the sensing point on the tubular film as changes in the predetermined diameter of the tubular film take place.

In FIGURES 4 and 5, the air jet issuing from nozzle 1 impinges at point J on contact arm 17 which is preferably a long, thin strip of spring bronze, Phosphor bronze or steel about 0.002–0.003 inch thick and up to 0.020–0.030 inch in width, the width being measured in the direction perpendicular to the plane of the drawing. The contact arm is pivoted at P by flexure pivot 18, supported by stable means not shown, and is surmounted by counterweight 19 to cancel out the component of gravitational force tending to swing arm 17 toward nozzle 1. The other extremity of the contact arm is urged into contact with inflated tubular film F at C by the force exerted by the air jet at J. To minimize sliding friction at C, and to reduce the possibility of scratching the surface of the film, the tip of contact arm 17 can be coated with a sprayed on, sintered coating of polytetrafluoroethylene.

In FIGURES 6 and 7, counterweights are not required on contact arms 17 since they move in a horizontal plane as opposed to the substantially vertical plane of movement in FIGURES 5 and 6.

In FIGURES 4 through 7, the force exerted on inflated tubular film F at sensing point C by contact arm 17 is reduced from the force exerted by the air jet impinging at point J by the factor $PJ/PC$. In addition, the ratio of radial motion of point C (as the tubular film expands or contracts in diameter) to the amount of motion of the contact arm at J may be expressed by the ratio $PC/PJ$. Thus not only is the force exerted at sensing point C reduced but the range of change of tubular film diameter which can be measured over the useful proximity range of the nozzles is greatly increased.

What is claimed is:

1. In a continuous process for the production of thermoplastic polymeric film in the form of an inflated tubular film of substantially circular cross section, wherein said inflated tubular film attains a predetermined diameter through the coaction of film temperature and gaseous pressure within said inflated tubular film, the improvement comprising: passing said inflated tubular film through an enclosing circular array of pneumatic proximity gauging nozzles disposed concentrically thereabout; detecting changes in said predetermined diameter of said inflated tubular film as fluctuations in the pressure of gaseous jets issuing from said nozzles; changing at least one of said coacting variables of temperature and pressure by means responsive to said pressure fluctuations, said change thereby counteracting the changes in the diameter of said inflated tubular film causing said pressure fluctuations.

2. The process of claim 1 wherein said gaseous jets impinge directly on the outer surface of said inflated tubular film.

3. The process of claim 1 wherein said gaseous jets impinge on surfaces remote from the detecting point on said inflated tubular film, the positions of said surfaces adapted to vary responsively to changes in the predetermined diameter of said inflated tubular film.

4. In a continuous process for the production of thermoplastic polymeric film in the form of an inflated tubular film of substantially circular cross section, wherein said inflated tubular film attains a predetermined diameter through the coaction of film temperature and gaseous pressure within said inflated tubular film, the improvement comprising: passing said inflated tubular film through an enclosing circular array of slidably adjustable pneumatic gauging nozzles concentrically disposed about a frame and in close proximity to the outer surface of said film; detecting changes in said predetermined diameter of said inflated tubular film as fluctuations in the pressure of gaseous jets issuing from said nozzles and impinging directly on the outer surface of said inflated tubular film; changing the gaseous pressure within said inflated tubular film by means responsive to the average diameter of said inflated tubular film as detected by said pressure fluctuations and changing the temperature of at least one individual lane of said inflated tubular film corresponding to the nozzle position from which said pressure fluctuation originated.

5. The process of claim 4 wherein said gaseous jets impinge on surfaces remote from the detecting points on said inflated tubular film, the positions of said surfaces adapted to vary responsively to changes in the predetermined diameter of said inflated tubular film.

References Cited in the file of this patent

UNITED STATES PATENTS 2,922,194   Lampard et al. ---------- Jan. 26, 1960

FOREIGN PATENTS 590,760   Canada ---------------- Jan. 12, 1960

OTHER REFERENCES

Miller: SPE Journal, December 1961, pages 1279–1281.